(12) United States Patent
Ronen

(10) Patent No.: US 12,392,663 B1
(45) Date of Patent: Aug. 19, 2025

(54) CHARACTERIZING OPTICAL SYSTEM PERFORMANCE WITH A COLOR CAMERA

(71) Applicant: Lumus Ltd., Ness Ziona (IL)

(72) Inventor: Eitan Ronen, Ness Ziona (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 19/100,194

(22) PCT Filed: Jan. 15, 2024

(86) PCT No.: PCT/IB2024/050386
§ 371 (c)(1),
(2) Date: Jan. 31, 2025

(87) PCT Pub. No.: WO2024/154042
PCT Pub. Date: Jul. 25, 2024

Related U.S. Application Data

(60) Provisional application No. 63/439,287, filed on Jan. 17, 2023.

(51) Int. Cl.
*G01J 3/50* (2006.01)
*H04N 23/85* (2023.01)

(52) U.S. Cl.
CPC ............ *G01J 3/506* (2013.01); *H04N 23/85* (2023.01)

(58) Field of Classification Search
CPC .................. G01J 3/506; H04N 23/85
See application file for complete search history.

(56) References Cited

U.S. PATENT DOCUMENTS

| 5,005,320 A | 4/1991 | Furmanak |
| 5,872,663 A | 2/1999 | Lee et al. |
| 6,404,550 B1 | 6/2002 | Yajima |

(Continued)

FOREIGN PATENT DOCUMENTS

WO 2019131277 A1 7/2019

OTHER PUBLICATIONS

International Search Report and Written Opinion issued for corresponding International Patent Application No. PCT/IB2024/050386, mailed May 2, 2024.

(Continued)

*Primary Examiner* — Tarifur R Chowdhury
*Assistant Examiner* — Akbar H. Rizvi
(74) *Attorney, Agent, or Firm* — Renner, Otto, Boisselle & Sklar, LLP

(57) ABSTRACT

A device, system, and method are provided for processing an output of a color camera, such that the color camera may be used to measure color uniformity and resolution of an optical system. The processing includes converting an output of the color camera into an XYZ color space using a conversion matrix. The conversion matrix is generated by capturing color images and colorimeter measurements of three different wavelength ranges of light. The processing also includes overcoming the deBayering effect of the color camera to measure a resolution of the optical system using an optical test target displayed by the optical system. The optical test target has a uniform appearance along a direction of homogeneity. The resolution is determined based on a one-dimension image generated by performing a mathematical operation along the direction of homogeneity.

5 Claims, 4 Drawing Sheets

(56) References Cited

U.S. PATENT DOCUMENTS

| | | | |
|---|---|---|---|
| 6,542,307 | B2 | 4/2003 | Gleckman et al. |
| 10,078,222 | B2 | 9/2018 | Komatsu et al. |
| 12,025,806 | B1 | 7/2024 | Danziger et al. |
| 2003/0165017 | A1 | 9/2003 | Amitai |
| 2006/0221448 | A1 | 10/2006 | Nivon et al. |
| 2007/0091445 | A1 | 4/2007 | Amitai |
| 2008/0198471 | A1 | 8/2008 | Amitai |
| 2008/0252738 | A1 | 10/2008 | Abe |
| 2009/0034069 | A1 | 2/2009 | Hsu |
| 2009/0122414 | A1 | 5/2009 | Amitai |
| 2009/0279180 | A1 | 11/2009 | Amitai et al. |
| 2011/0025703 | A1* | 2/2011 | Edge .................. H04N 1/6033 345/591 |
| 2013/0242392 | A1 | 9/2013 | Amirparviz et al. |
| 2015/0138451 | A1 | 5/2015 | Amitai |
| 2015/0348245 | A1* | 12/2015 | Horiuchi ................ H04N 9/646 382/167 |
| 2016/0116739 | A1 | 4/2016 | TeKolste et al. |
| 2017/0363799 | A1 | 12/2017 | Ofir et al. |
| 2018/0210202 | A1 | 7/2018 | Danziger |
| 2018/0292599 | A1 | 10/2018 | Ofir et al. |
| 2019/0064518 | A1 | 2/2019 | Danziger |
| 2020/0209667 | A1 | 7/2020 | Sharlin et al. |
| 2020/0292744 | A1 | 9/2020 | Danziger |
| 2021/0033774 | A1 | 2/2021 | Tanaka |
| 2021/0101245 | A1 | 4/2021 | Han et al. |
| 2022/0003988 | A1 | 1/2022 | Finlayson et al. |
| 2022/0155629 | A1 | 5/2022 | Sharlin et al. |
| 2022/0357497 | A1 | 11/2022 | Ronen et al. |
| 2022/0357498 | A1 | 11/2022 | Fuchs et al. |
| 2022/0388108 | A1 | 12/2022 | Maziel et al. |
| 2023/0228932 | A1 | 7/2023 | Eisenfeld et al. |
| 2023/0305230 | A1 | 9/2023 | Chriki et al. |
| 2024/0231099 | A1 | 7/2024 | Danziger et al. |

OTHER PUBLICATIONS

INF-GEO4310 2010 Solutions, Geometrical Optics, Part 1, Fritz Albregtsen Dec. 31, 2010 available at https://www.uio.no/studier/emner/matnat/ifi/INF-GEO4310/h10/undervisningsmateriale/solution-geometric-imaging-01.pdf Dec. 31, 2010 (Dec. 31, 2010).

* cited by examiner

CHARACTERIZING OPTICAL SYSTEM PERFORMANCE WITH A COLOR CAMERA

RELATED APPLICATIONS

This application is a national phase of International Application No. PCT/IB2024/050386, filed on Jan. 15, 2024, which claims the benefit of U.S. Provisional Patent Application No. 63/439,287, filed on Jan. 17, 2023, each of which is hereby incorporated herein by reference in its entirety.

TECHNICAL FIELD

The present disclosure relates generally to color imaging and more particularly to characterizing optical system performance using a color camera.

BACKGROUND

Analyzing optical systems typically includes characterizing color uniformity and resolution. However, to characterize the resolution of an optical system, the measuring system typically requires a higher resolution than the measured optical system. In addition, to measure color uniformity of the optical system accurately, measuring systems are typically required to output a measurement of the color uniformity in XYZ values of the CIE1931 color space. XYZ values from the CIE1931 color space are commonly used as a standard for quantifying and communicating colors. To output values in XYZ, most measurement systems use an imaging colorimeter.

Near Eye Displays are often used in applications like virtual reality (VR) or augmented reality (AR) headsets. The Eye Motion Box (EMB) refers to a defined space or volume where a user's eyes can move while still being able to clearly see the image produced by a Near Eye Display (NED) system. The Eye Motion Box determines the range of natural eye movement allowed without losing the clarity or focus of the displayed image. If the EMB is too small, the user might frequently find parts of the image becoming blurry or going out of view, which can be uncomfortable and disrupt the immersive experience. Therefore, measuring and optimizing the EMB is important to ensure a comfortable and effective viewing experience for the user.

SUMMARY

As opposed to using standard imaging colorimeters, it would be preferable to use a simple off the shelf "regular" color camera to measure the color uniformity and the resolution of an optical system.

The problem with measuring properties of the EMB (Eye Motion Box) using standard imaging colorimeters is the size of the colorimeter. Imaging colorimeters are typically too large to easily scan different positions of the EMB of the WG (wave guide) of an NED (near eye display) system.

The problem with using standard color cameras to measure optical properties is that color cameras use demosaicing algorithms (also referred to as the deBayering effect) to generate color images. deBayering is applied to images captured by cameras using a Bayer filter (i.e., a grid of red, green, and blue filters) over the image sensor. Each sensor pixel captures light from only one primary color, so the raw image data contains incomplete color information. Demosaicing algorithms then interpolate the missing colors for each pixel by analyzing adjacent pixels, effectively reconstructing a full-color image. The deBayering process of the image interpolation of the camera degrades the resolution of the camera.

The present disclosure provides a device, system, and method for processing an output of an off-the-shelf color camera, such that the color camera may be used to measure color uniformity and resolution of an optical system.

In one embodiment, the present disclosure provides a device, system, and method for converting an output of a camera into an XYZ color space using a conversion matrix generated by comparing an output of the camera to the output of a colorimeter for at least three different wavelength ranges of light.

In another embodiment, the present disclosure provides a device, system, and method for overcoming the deBayering of a color camera so that the color camera may be used to measure a resolution of an optical system by using a raw green channel image of a optical test target from the color camera and performing a mathematical operation along a direction of homogeneity of the optical test target.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
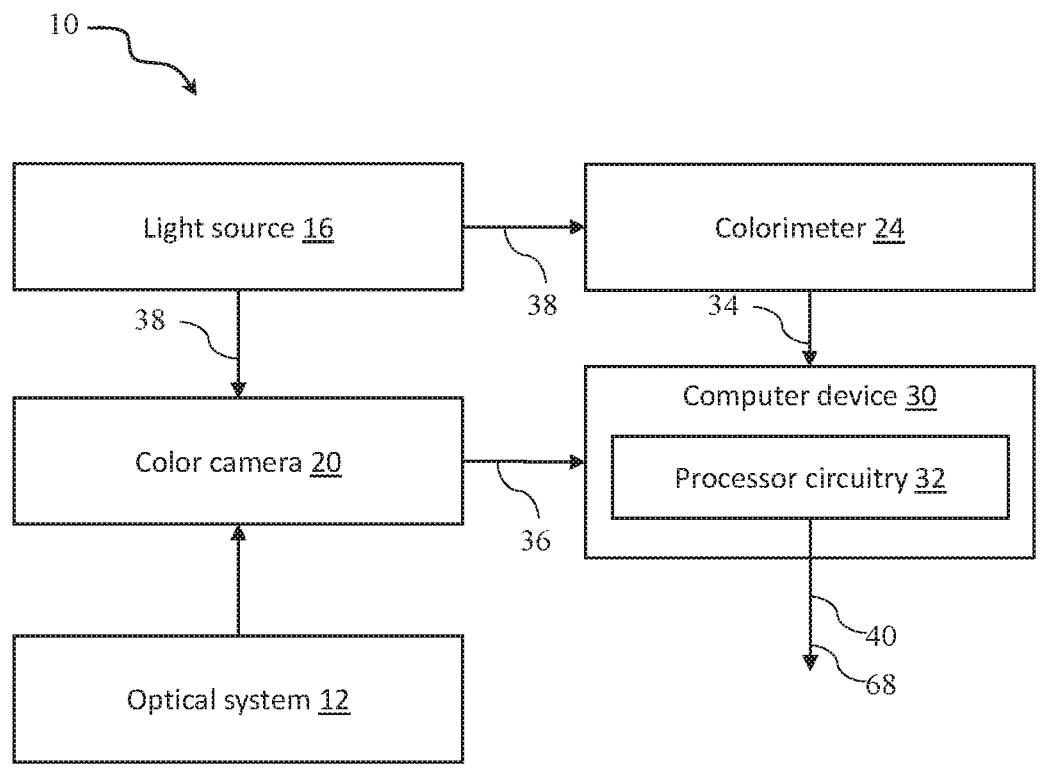
FIG. 1 is an exemplary block diagram of a measurement system for measuring optical properties of an optical system.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a device, system, and method for processing an output of an off-the-shelf color camera, such that the color camera may be used to measure color uniformity and resolution of an optical system. The processing includes converting an output of the camera from one color space (e.g., RGB) into an XYZ color space using a conversion matrix. The conversion matrix is generated by capturing color images of three different wavelength ranges of light. A colorimeter is also used to measure the three different wavelength ranges of light in the XYZ color space. An output of the colorimeter and the color camera for the three wavelength ranges of light are compared to generate a conversion matrix for converting from the color space of the camera to the XYZ color space. The output of the color camera is then multiplied by the conversion matrix to convert into the XYZ color space. The processing also includes overcoming the deBayering effect of the color camera to measure a resolution of the optical system. To measure the resolution of the optical system, the color camera captures an image of an optical test target displayed by the optical system. The optical test target has a known pattern of contrasting structures having a known spacing, such that the optical test target has a uniform appearance along a direction of homogeneity. A one-dimensional image is generated by performing a mathematical operation (e.g., summing, averaging, convolution, etc.) along a direction of homogeneity of the optical test target. The resolution of the optical system is then determined based on the known spacing of the contrasting structures of the optical test target and the testing one-dimension image.

Turning to FIG. 1, a measurement system 10 is shown for measuring optical properties of an optical system 12 using an optical test target 14 (FIG. 4) and a light source 16. The measurement system 10 includes a color camera 20, colorimeter 24, and computer device 30.

As is described in further detail below, the computer device 30 converts an output of the color camera 20 into an XYZ color space using the light source 16 and based on an output of the colorimeter 24. The computer device 30 also measures a resolution of the optical system 12 from images generated by the color camera 20 imaging of the optical system 12 displaying the optical test target 14. The computer device 30 includes processor circuitry 32 for performing these tasks.

Figure 2:
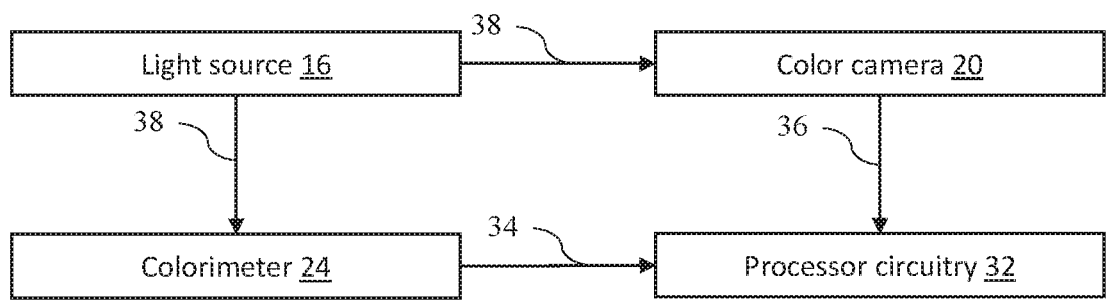
FIG. 2 is an exemplary block diagram of processor circuitry receiving an output of a color camera and colorimeter based on light emitted by a light source.

Turning to FIG. 2, when converting the output of the color camera 20 into the XYZ color space, the processor circuitry 32 determines a colorimeter output 34 and a camera output 36 for three wavelength ranges of light. Three different wavelength ranges of light may be used, because the XYZ color space (also referred to as the tristimulus light metric) is additive. For example, when both red and blue light are displayed, the XYZ value is equal to the linear summation of the two separate sources (i.e., the red light and the blue light). Due to this additivity, each color may be represented by a linear vector with three elements. For example, red light may be represented as [1; 0; 0], the green color as [0; 1; 0] and blue light as [0; 0; 1], with white light represented as the summation [1; 1; 1]. By using three different wavelength ranges of light (e.g., red, green, and blue), the XYZ value can be measured by the colorimeter 24 and compared to the output of the color camera 20.

The three different wavelength ranges may be referred to as three different colors. Each of the three different colors may be a Gaussian distribution of wavelengths distributed around a main wavelength (also referred to as a central wavelength). These three different colors may match the three colors (i.e., the dimensions) of the color space of the color camera. The optical system may also include a light emitter outputting three colors (i.e., wavelength ranges of light). The three different colors may match the colors of the light emitter of the optical system.

In one embodiment, the light source may be the light emitter of the optical system. That is, the color camera and colorimeter may measure the output of the light emitter of the optical system.

In another embodiment, the light source may be a separate device from the light emitters of the optical system, but the light source may have similar output properties (e.g., wavelength range, intensity, etc.) as the light emitter of the optical system). The separate light source may have the same light emission properties as the light emitter of the optical system.

For each of the three wavelength ranges, the processor circuitry 32 receives the colorimeter output 34 from the colorimeter 24 based on measurement of the light source 16 while the light source 16 is emitting light 38 having the wavelength. That is, the light source 16 emits light 38 having the wavelength, the colorimeter 24 measures the emitted light 38 having the wavelength, and the processor circuitry 32 receives the colorimeter output 34 of this measurement. Similarly, for each of the three wavelength ranges, the processor circuitry 32 also receives the camera output 36 from the camera 20 based on the imaging of the emitted light 38 having the wavelength. That is, the light source 16 emits light 38 having the wavelength, the camera 20 images the emitted light 38 having the wavelength, and the processor circuitry 32 receives the camera output 36 of this imaging.

As described above, the colorimeter output and the camera output are in different color spaces. That is, while the colorimeter output is in the XYZ color space, the camera output is in a camera color space different from the XYZ color space. The colorimeter 24 may be any suitable device for outputting in the XYZ color space a measurement of incoming light. For example, the colorimeter may be a point colorimeter that outputs a single XYZ value for incoming light. In this way, instead of using an imaging colorimeter (outputting an array of measurement values of a scene) as described above, the present disclosure may make use of a point colorimeter.

In one embodiment, the camera color space may be in the RGB (red, green, blue) color space. For example, the output of the camera may include an array of pixels. For each pixel of the array of pixels, the camera output may include a red value, a green value, and a blue value, such that each pixel of the array of pixels represents a vector formed by the red value, the green value, and the blue value.

The color camera 20 may be any suitable device for outputting an image including an array of pixels in an additive color space (e.g., RGB). That is, the color camera 20 may encompass various configurations and components. For instance, the color camera 20 may include an image sensor (e.g., CCD or CMOS sensor), a digital signal processor (DSP), lens assemblies, and integrated circuits for image processing. The color camera 20 may also include ancillary hardware such as autofocus mechanisms, optical image stabilization modules, memory (e.g., embedded memory, removable storage media, etc.).

In addition to the camera color space being in the RGB color space, the three wavelength ranges of light emitted by the light source 16 may include red, green, and blue. For example, the three wavelength ranges of light may be emitted separately (i.e., at different times), such that the measuring and imaging of the first wavelength (e.g., red light), the second wavelength (e.g., green light), and the third wavelength (e.g., blue light) with the colorimeter and the camera respectively occur at different non-overlapping times. In this way, the red light, green light, and blue light may be imaged by the color camera 20 and measured by the colorimeter 24 individually so that the camera output 36 and the colorimeter output 34 are separately known for each dimension (e.g., R, G, and B) of the camera color space.

The light source 16 may be any suitable structure for emitting light. For example, the light source 16 may include one or more light emitting diodes (LEDs), organic LEDs (OLEDs), microLEDs, laser diodes, mini-LED, quantum dot (QD)-conversion, phosphor conversion, excimer lamps, multi-photon combination, or SLM wavefront manipulation. The light source 16 may include additional components for modifying a wavelength of the emitted light (e.g., a color wheel). For example, the light source 16 may be a display, waveguide, etc.

Continuing the above example in the RGB color space, the camera output 36 for the red wavelength of light may be represented as $[R_r; G_r; B_r]^T$, with the camera output for the green wavelength of light represented as $[R_g; G_g; B_g]^T$, and the camera output for the blue wavelength of light represented as $[R_b; G_b; B_b]^T$. Similarly, the colorimeter output for the red wavelength of light may be represented as $[X_r; Y_r; Z_r]^T$, with the colorimeter output for the green wavelength of light represented as $[X_g; Y_g; Z_g]^T$, and the colorimeter output for the blue wavelength of light represented as $[X_b; Y_b; Z_b]^T$.

The processor circuitry 32 generates a colorimeter matrix ($M_{xyz}$) by combining the colorimeter output 34 for the three wavelength ranges, such that the colorimeter output 34 of each of the three wavelength ranges forms a column of the matrix. Similarly, the processor circuitry 32 generates a camera matrix ($M_{camera}$) by combining the camera output 36 for the three wavelength ranges, such that the camera output 36 of each of the three wavelength ranges form a column of the matrix.

Continuing the above example for RGB emitted light and RGB color space, the camera matrix and colorimeter matrix may be defined as follows:

$$M_{camera} = \begin{matrix} R_r & R_g & R_b \\ G_r & G_g & G_b \\ B_r & B_g & B_b \end{matrix} \quad M_{xyz} = \begin{matrix} X_r & X_g & X_b \\ Y_r & Y_g & Y_b \\ Z_r & Z_g & Z_b \end{matrix}$$

The processor circuitry 32 uses $M_{xyz}$ and $M_{camera}$ to convert the output of the camera into the XYZ color space. To do so, the processor circuitry generates a conversion matrix ($M_{conversion}$) by multiplying $M_{xyz}$ by an inverse of $M_{camera}$ as shown below:

$$Mconversion = Mxyz * Mcamera^{-1}$$

The processor circuitry 32 uses $M_{conversion}$ by receiving the output of the camera 36 and generating a converted output 40 by applying $M_{conversion}$ to the output of the camera 36. By applying $M_{conversion}$ to the camera output 36, the converted output 40 is in the XYZ color space. The processor circuitry 32 also outputs the converted output 40.

In one embodiment, the output of the camera is an image comprising an array of pixels. $M_{conversion}$ may be applied to the output of the camera 36 by multiplying each pixel of the array of pixels by $M_{conversion}$. Alternatively, instead of converting each pixel of the camera output, the processor circuitry 32 may group each of the pixels into pixel blocks. Each pixel block may be a group of neighboring pixels (e.g., 10×10 pixels, 100×100 pixels, etc.). For each of the pixel blocks, the processor circuitry 32 may calculate a red value, green value, and blue value based on an average of red value, green value, and blue value of the pixels in the pixel block. The processor circuitry 32 may then apply $M_{conversion}$ to the output of the camera by multiplying a vector of the red value, green value, and blue value of each pixel block by $M_{conversion}$.

Figures 3, 4:
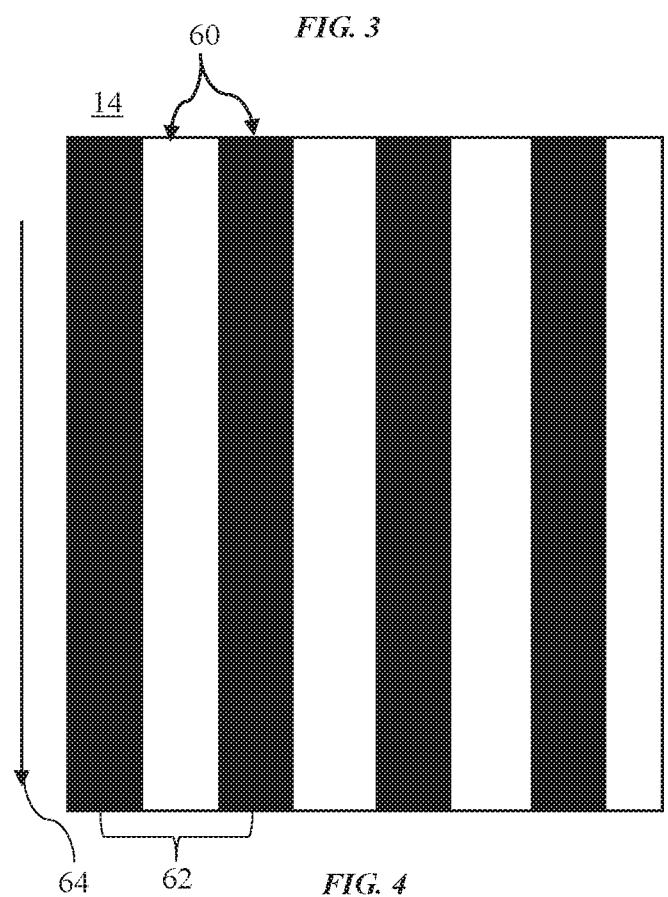
FIG. 3 is an exemplary block diagram of red, green, and blue pixels in a color camera.
FIG. 4 depicts an exemplary optical test target.
Figure 5:
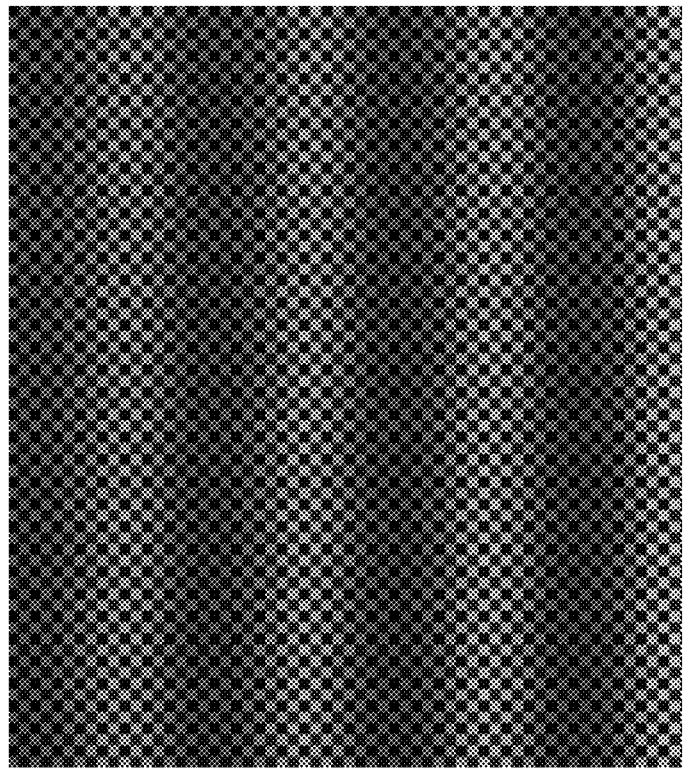
FIG. 5 depicts an exemplary raw green test image of the optical test target of FIG. 4.

Turning to FIGS. 3,4, and 5, when measuring the resolution of the optical system 12, the processor circuitry 32 receives a raw image 50 from the color camera 20. The raw image 50 is an image of the optical system 12 displaying the optical test target 14. The raw image includes green image data 52. This green image data 52 is analyzed to determine a resolution of the optical system 12. That is, the green image data 52 instead of a monochromatic image.

The color camera 20 may be a Bayer based color camera 20. As shown in FIG. 3, the raw image 50 may include an array of pixels 54 having different color sensitivity. The pixel array 54 may have a checkerboard structure with predominantly green pixels (G1, G3, G5, G7, G9, G11, G13, G15, G17, G19, G21, G23, G25) intermixed with a combination of red pixels (R2, R4, R12, R14, R22, R24) and blue pixels (B6, B8, B10, B16, B18, B20).

As an example, a monochromatic image from the color camera 20 is not used, because in monochromatic gray level mode, the gray level value of each pixel is a linear combination of the RGB values of each pixel according to a photopic weight. This linear combination of the RGB values results in smoothing of the image in a monochromatic mode, because the value of each pixel is overlapped with its nearest and next nearest neighbors. This linear combination can reduce the resolution of the monochromatic image. For this reason, the processor circuitry 32 uses the green image data 52 instead of a monochromatic image output by the color camera 20. The green image data 52 may be used (i.e., instead of the red and blue image data), because the photopic curve of the human eye is similar to the photopic curve of the green pixels.

As described above, the raw image 50 is an image of the optical system 12 displaying the optical test target 14. An optical test target 14 is displayed by the optical test target 14, because the optical test target has a known pattern of contrasting structures 60 having a known spacing 62, such that the optical test target 14 has a uniform appearance along a direction of homogeneity 64. These known properties of the optical test target 14 and the direction of homogeneity 64 are used to calculate the resolution of the optical system 12.

In one embodiment, as shown in FIG. 4, the optical test target 14 may be a Ronchi ruling. In this example, the direction of homogeneity 64 is vertical. However, the direction of homogeneity 64 may be horizontal, vertical, or any suitable direction.

The processor circuitry 32 separates the green image data into a raw green test image 56 having pixels 54. For example, the green image data may be separated by changing the gain of the color camera, such that the output of the red and blue pixels is zero. FIG. 5 depicts a raw green test image 56 of the optical test target 14 shown in FIG. 4. The raw green test image 56 has a checkerboard appearance with the black pixels representing the red and blue pixels as shown in FIG. 3.

Figure 6:
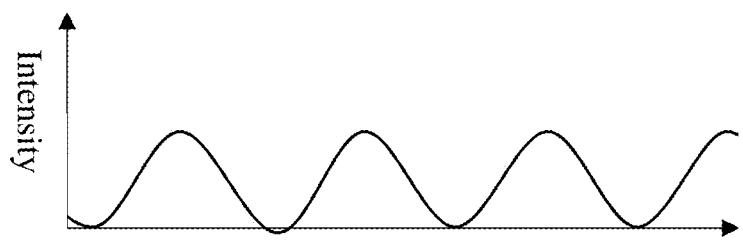
FIG. 6 depicts an exemplary testing one-dimension image of the exemplary raw green test image of FIG. 5.

The processor circuitry 32 generates a testing one-dimension image 66 based on a mathematical operation performed on the raw green testing image 56 along the direction of homogeneity 64. The mathematical operation may include at least one of convolution, summation, or averaging. As an example, a one-dimension image 66 generated from summing the raw green test image 56 along the vertical direction (i.e., the direction of homogeneity 64) is shown in FIG. 6.

In one embodiment, the mathematical operation may include convolution along the direction of homogeneity using an array having an orientation matching the direction of homogeneity. For example, when the direction of homogeneity is horizontal, the array may be a horizontal array having a horizontal orientation. Similarly, when the direction of homogeneity is vertical, the array may be a vertical array having a vertical orientation.

The processor circuitry 32 determines and outputs 68 the resolution of the optical system 12 along the direction of homogeneity 64 based on the known spacing 62 of the contrasting structures 60 of the optical test target 14 and the testing one-dimension image 66. For example, the optical system 12 may be determined to have a resolution at least matching the known spacing 62 of the optical test target 14 when the contrasting structures 60 are discernable in the testing one-dimension image 66. Similarly, the optical system 12 may be determined to have a resolution less than the known spacing 62 when the contrasting structures 60 are not discernable in the testing one-dimension image.

For example, when displaying an optical test target 14 having a known spacing 62 of 1 mm along the horizontal direction, the optical system 12 may be determined to have a resolution of at least 1 mm if neighboring contrasting structures 60 are discernable in the testing one-dimension image 66. Conversely, if neighboring contrasting structures 60 are not discernable in the testing one-dimension image 66, then the resolution of the optical system 12 along the horizontal dimension may be determined to be less than 1 mm.

In another example, a single optical test target 14 may be used. The measured contrast of the contrasting structures 60 in the testing one-dimension image of this optical test target 14 may be used to determine a resolution of the system. For example, a contrast of 20% may be known to correlate to a specific resolution for this optical test target 14. Alternatively, a contrast of the optical test target 14 may be used as a measure of a resolution of the optical system.

The contrasting structures 60 may be determined to be discernable when the contrast between the contrasting structures 60 is greater than a minimum detection threshold. For example, the contrast between the contrasting structures 60 in the testing one-dimension image 66 may be determined based on a maximum and minimum of the testing one-dimension image 66. As an example, the average max value of the testing one-dimension image 66 may be determined (e.g., the average value of the peaks of the sinusoidal structure shown in FIG. 6) and the average min value of the testing one-dimension image 66 may be determined (e.g., the average value of the troughs of the sinusoidal structure shown in FIG. 6). The contrast may be determined based on the difference between this max value and this min value.

The processor circuitry 32 may determine the vertical and horizontal resolution of the optical system 12 by performing the above-described process twice. Once with the optical system displaying the optical test pattern having a horizontal direction of homogeneity 64 (i.e., to determine the horizontal resolution) and once with the optical system displaying the optical test pattern having a vertical direction of homogeneity 64 (i.e., to determine the vertical resolution).

Figure 7:
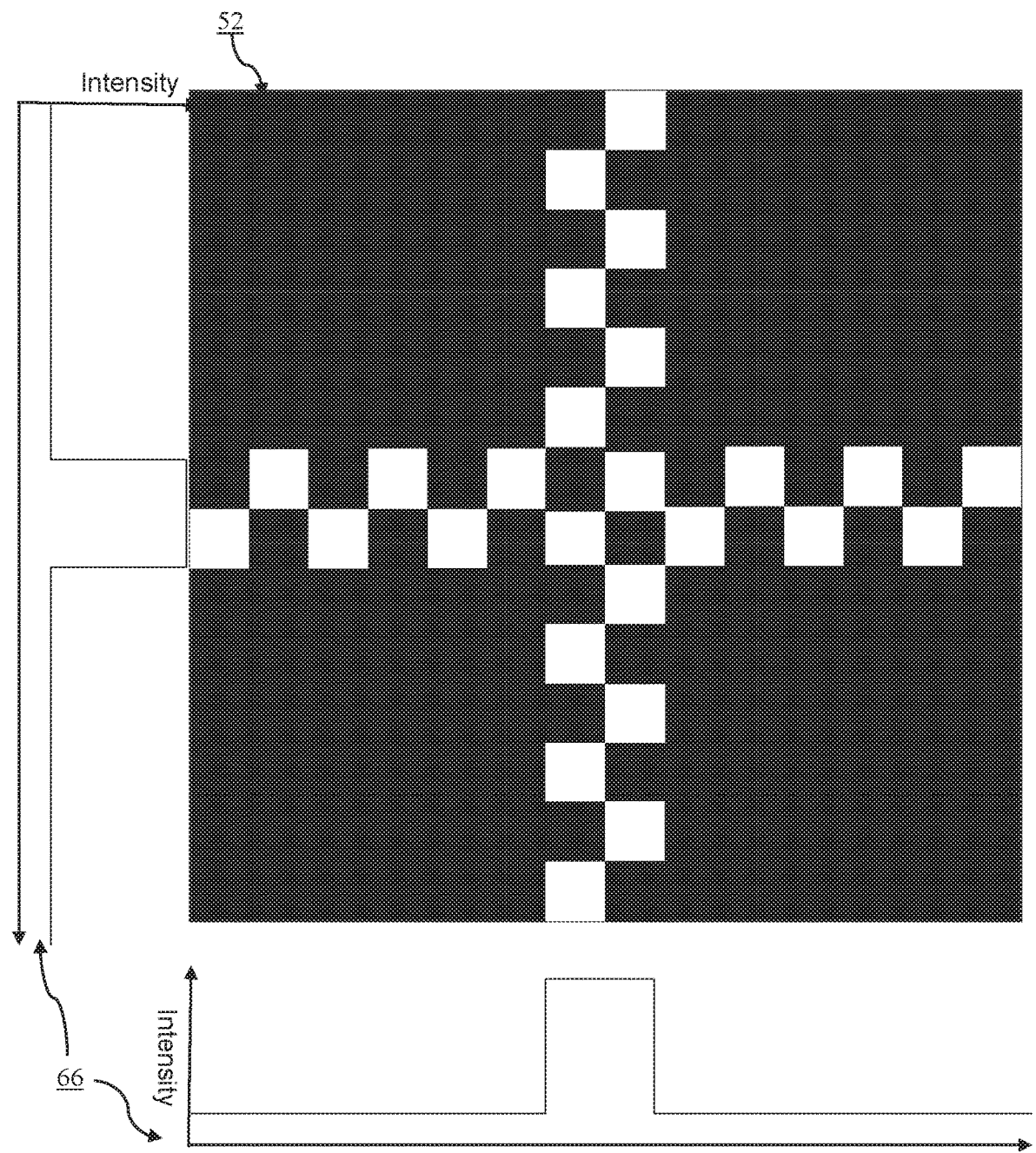
FIG. 7 depicts an exemplary raw green test image of a cross shaped test target.

Alternatively, instead of measuring the vertical and horizontal resolution separately a cross shaped optical test target may be used as shown in FIG. 7. FIG. 7 depicts a raw green test image of a cross shaped optical test target. At the bottom and left side of the raw green test image, a testing one-dimension image are shown representing a summation in the vertical and horizontal direction respectively. As shown, the camera only grabs half of the pixels (i.e., only the green pixels); however, the resolution of the camera is not harmed and the summed 1D curves are not affected.

By measuring the width of the cross, one can analyze line spread function of the system and the modulation transfer function (MTF) of the system (i.e., by performing a Fourier Transform of the line spread function of the optical system).

The processor circuitry 32 may output the determined resolution and the converted output in any suitable manner. For example, the processor circuitry 32 may output this data by storing the data in memory, transmitting the data via a network interface, displaying the data on a display, etc.

The computer device 30 may encompass a range of configurations and designs. For example, the computer 10 may be implemented as a single device, such as a server, desktop computer, laptop, or other standalone units. These individual devices may incorporate essential components like a central processing unit (CPU), memory modules (including random-access memory (RAM) and read-only memory (ROM)), storage devices (like solid-state drives or hard disk drives), and various input/output (I/O) interfaces. Alternatively, the computer device 30 might constitute a network of interconnected computer devices, forming a more complex and integrated system. This could include server clusters, distributed computing environments, or cloud-based infrastructures, where multiple devices are linked via network interfaces to work cohesively, often enhancing processing capabilities, data storage, and redundancy.

The processor circuitry 32 may have various implementations. For example, the processor circuitry 32 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 32 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 32. The processor circuitry 32 may be communicatively coupled to the computer readable medium and network interface through a system bus, mother board, or using any other suitable structure known in the art.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer device for measuring optical properties of an optical system from images generated by a color camera based on an output of a colorimeter, an optical test target, and using a light source, the computer device comprising processor circuitry configured to:
   convert an output of the color camera into an XYZ color space based on the output of the colorimeter by:
   determining a colorimeter output and a camera output for three wavelength ranges of light by, for each of the three wavelength ranges:
      receiving the colorimeter output from the colorimeter based on measurement of the light source while the light source is emitting light having the wavelength, wherein the colorimeter output is in the XYZ color space;
      receiving the camera output from the camera based on imaging of the light source while the light source is emitting light having the wavelength, wherein the camera output is in a camera color space different from the XYZ color space;
   generating a colorimeter matrix ($M_{xyz}$) by combining the colorimeter output for the three wavelength ranges, such that the colorimeter output of each of the three wavelength ranges forms a column of the matrix;
   generating a camera matrix ($M_{camera}$) by combining the camera output for the three wavelength ranges, such that the camera output of each of the three wavelength ranges forms a column of the matrix;
   generating a conversion matrix ($M_{conversion}$) by multiplying the $M_{xyz}$ by an inverse of $M_{camera}$;
   receiving the output of the camera;
   generating a converted output by applying $M_{conversion}$ to the output of the camera, such that the converted output is in the XYZ color space; and
   outputting the converted output;
and
   measure a resolution of the optical system displaying the optical test target by:
   receiving a raw image from the color camera of the optical system displaying the optical test target, wherein:
      the raw image includes green image data;
      the optical test target has a known pattern of contrasting structures having a known spacing, such that the optical test target has a uniform appearance along a direction of homogeneity;
   separating the green image data into a raw green test image comprising pixels;
   generating a testing one-dimension image based on a mathematical operation performed on the raw green testing image along the direction of homogeneity;
   determining the resolution of the optical system along the direction of homogeneity based on the known spacing of the contrasting structures of the optical test target and the testing one-dimension image; and
   outputting the determined resolution.

2. The computer device of claim 1, wherein the light source is part of the optical system being measured.

3. A computer device for converting an output of a color camera into an XYZ color space based on an output of a colorimeter and using a light source, the computer device including processor circuitry configured to:
   determine a colorimeter output and a camera output for three wavelength ranges of light by, for each of the three wavelength ranges:
      receiving the colorimeter output from the colorimeter based on measurement of the light source while the light source is emitting light having the wavelength, wherein the colorimeter output is in the XYZ color space;
      receiving the camera output from the camera based on imaging of the light source while the light source is emitting light having the wavelength, wherein the camera output is in a camera color space different from the XYZ color space;
   generate a colorimeter matrix ($M_{xyz}$) by combining the colorimeter output for the three wavelength ranges, such that the colorimeter output of each of the three wavelength ranges forms a column of the matrix;
   generate a camera matrix ($M_{camera}$) by combining the camera output for the three wavelength ranges, such that the camera output of each of the three wavelength ranges forms a column of the matrix;
   generate a conversion matrix ($M_{conversion}$) by multiplying the $M_{xyz}$ by an inverse of $M_{camera}$;
   receive the output of the camera;
   generate a converted output by applying $M_{conversion}$ to the output of the camera, such that the converted output is in the XYZ color space; and
   output the converted output.

4. The computer device of claim 3, wherein the camera color space is in the red, green, and blue (RGB) color space.

5. A computer device for measuring a resolution of an optical system from images generated by a color camera capturing an image of the optical system displaying an optical test target, the computer device comprising processor circuitry configured to:
   receive a raw image from the color camera of the optical system displaying the optical test target, wherein:
      the raw image includes green image data;
      the optical test target has a known pattern of contrasting structures having a known spacing, such that the optical test target has a uniform appearance along a direction of homogeneity;
   separate the green image data into a raw green test image comprising pixels;
   generate a testing one-dimension image based on a mathematical operation performed on the raw green testing image along the direction of homogeneity;
   determine the resolution of the optical system along the direction of homogeneity based on the known spacing of the contrasting structures of the optical test target and the testing one-dimension image; and
   output the determined resolution.

* * * * *